United States Patent [19]

King

[11] 3,764,526
[45] Oct. 9, 1973

[54] DYNAMICS REVERSE OSMOSIS MEMBRANES OF ULTRATHIN DISCS

[75] Inventor: William M. King, Diamond Bar, Calif.

[73] Assignee: The United States of America as represented by the Secretary of the Interior, Washington, D.C.

[22] Filed: Mar. 28, 1972

[21] Appl. No.: 238,906

[52] U.S. Cl. .................. 210/23, 210/321, 210/490, 210/500
[51] Int. Cl. ............................................. B01d 13/00
[58] Field of Search ....................... 210/22, 23, 321, 210/490, 500

[56] References Cited
UNITED STATES PATENTS 3,662,046   5/1972   Woo Woo et al. ............. 210/500 X
3,674,152   7/1972   Manjikian ........................... 210/321
3,580,841   5/1971   Cadotte et al. ....................... 210/23

Primary Examiner—Frank A. Spear, Jr.
Attorney—Ernest S. Cohen et al.

[57] ABSTRACT

Ultrathin membrane discs are prepared by spraying a casting solution of the membrane material onto a surface to form a number of individual discs, allowing the solvent to evaporate from the discs, and removing the discs from the casting surface. Slurries of these discs may be used to form dynamic membranes suitable for use in reverse osmosis applications such as the desalination of water.

9 Claims, 5 Drawing Figures

PATENTED OCT 9 1973  3,764,526

(SMALLEST UNIT = 10 μm)

(SMALLEST UNIT = 10 μm)

DYNAMICS REVERSE OSMOSIS MEMBRANES OF ULTRATHIN DISCS

BACKGROUND

Osmosis is a naturally occurring phenomenon in which pure solvent flows from a dilute solution to a more concentrated solution through a semipermeable membrane. The flow of water continues until a particular pressure difference across the membrane is reached, this pressure difference being the characteristic osmotic pressure of the system. By applying a pressure greater than osmotic to the concentrated solution, the flow of water through the semipermeable membrane can be reversed and pure water will flow from the concentrated to the dilute solution. Unlike osmosis which tends to mix dilute and concentrated solutions, reverse osmosis can separate solvent and solute. By applying pressure to a concentrated solution in contact with the appropriate semipermeable membrane, pure solvent may be recovered from the opposite side. Thus, reverse osmosis has been applied with some success to effect various separations, and particularly it has evoked considerable interest for the desalination of water.

The efficacy of separation by reverse osmosis seems inseparably tied to the quality of the semipermeable membrane used. The osmotic properties which are most often employed as an indication of the capability of the membrane are the selectivity and the solvent flux. Selectivity is an indication of the ability of the membrane to distinguish between solvent and solute—its relative ability to prevent the passage of solute while permitting the passage of solvent. The usual term indicative of the selectivity is the percentage salt rejection which is defined as 100 times the difference in the concentration of the solute in the feed stream and in the permeate divided by the concentration of the feed stream. The other important property of the membrane is the flux which is the rate of flow of permeate through a unit area of the membrane. It is generally indicated in units of gallons per square foot per day.

A membrane which has acceptable osmotic properties will be uneconomical unless it can maintain these properties for a reasonable length of time. Unfortunately, experience has shown that reverse osmosis membranes are susceptible to several factors which cause a loss in performance. Chemical and/or biological degradation of the membrane may occur as well as fouling of the membrane surface by impurities in the water. In addition, the structure of many conventional membranes is compacted by the high pressures used in desalination by reverse osmosis causing an appreciable loss in the flux and product recovery. Other mechanical failures of the membranes such as leaks or cracks lead to appreciable flow of brine through the membrane and contamination of the product water. When the reverse osmosis membrane has become less effective for one of these reasons, replacement may be required. This is extremely expensive since the dismantling of the high pressure equipment and the replacement of the large amounts of membrane surface requires considerable amounts of time.

Several methods have been applied to solve these difficulties by forming the membrane in situ. One method is shown in U.S. Pat. No. 3,592,763 in which membranes are formed in tubular porous supports by forcing a solution of the membrane through the tube with a gas column. The membrane is formed on the inside walls and is perfected by pumping air, hot water, etc., through the tube. When the performance of the membrane becomes uneconomical, the old membrane can be dissolved and a new membrane formed in situ, thereby, saving the cost of dismantling the equipment and physically replacing the membranes.

Another method which has been used to form membranes in situ is to pass a suspension of discrete particles over a porous supporting cloth, to deposit a layer of the particles on the support and to maintain the layer with the pressure used in reverse osmosis separation. The dynamic membrane, as it is called, has several advantages over the continuous membrane formed in situ: first, it is easier to remove a dynamic membrane merely by controlling the pressure and flow of water, and secondly, the membranes can be repaired by passing a suspension of the particles through the feed-side of the separation cell to patch any "leaks" in the particle layer.

Dynamic membranes of various materials are shown, for example, in U.S. Pat. Nos. 3,503,789, 3,344,928, and 3,413,219. Only two patents suggest, however, that dynamic membranes can be formed of neutral organic polymers especially those commonly employed in the formation of conventional membranes, for example, cellulose acetate. U.S. Pat. No. 3,537,988 mentions that neutral organic polymers may be used as a membrane-forming additive. No indication, however, is given of the manner in which these materials could be employed as an additive. Similarly, U.S. Pat. No. 3,331,722 mentions that water solvating materials such as cellulose acetate, cellulose propionate etc. may be used to form dynamic membranes. The materials are employed in the form of numerous discrete particles with an average diameter greater than about 0.10 micron and preferably greater than 1.0 micron. Although the patent mentions that these particles may be formed by any size reduction technique, there is no indication of how particles of cellulose acetate and similar polymers could be prepared.

The present invention is aimed at a method of preparing dynamic membranes from ultrathin membrane discs formed from any conventional membrane material.

It is another object of my invention to form ultrathin membrane discs from membrane materials, each disc exhibiting osmotic and physical properties which make it admirably suited for the formation of dynamic membranes.

It is a further object of my invention to provide a reverse osmosis process which utilizes a membrane comprising a layer of ultrathin membrane discs.

THE INVENTION

I have now discovered a method by which improved dynamic membranes suitable for reverse osmosis may be prepared. A significant feature of the invention is the discovery that dynamic membranes can be formed from suspensions of ultrathin membrane discs which are in themselves tiny reverse osmosis membranes.

I have found that these ultrathin membrane discs may be prepared from a solution of a conventional membrane material such as cellulose acetate by spraying the solution at controlled conditions onto an appropriate casting surface. Numerous droplets are formed on the casting surface and the evaporation of the solvent from these droplets forms the membranes. After appropriate post casting treatments a dilute suspension of these membranes discs can be prepared and used in the formation of dynamic reverse osmosis membranes.

The accompanying drawings illustrate several aspects of my invention. FIG. 1 shows the process of forming a dynamic membrane from a dispersion of ultrathin membrane discs, FIG. 2 is an illustration of this dynamic membrane, and FIG. 3 shows the removal of the dynamic membrane.

FIGS. 4 and 5 are photomicrographs of ultrathin membrane discs.

DETAILED DESCRIPTION OF THE INVENTION

Figure 1:
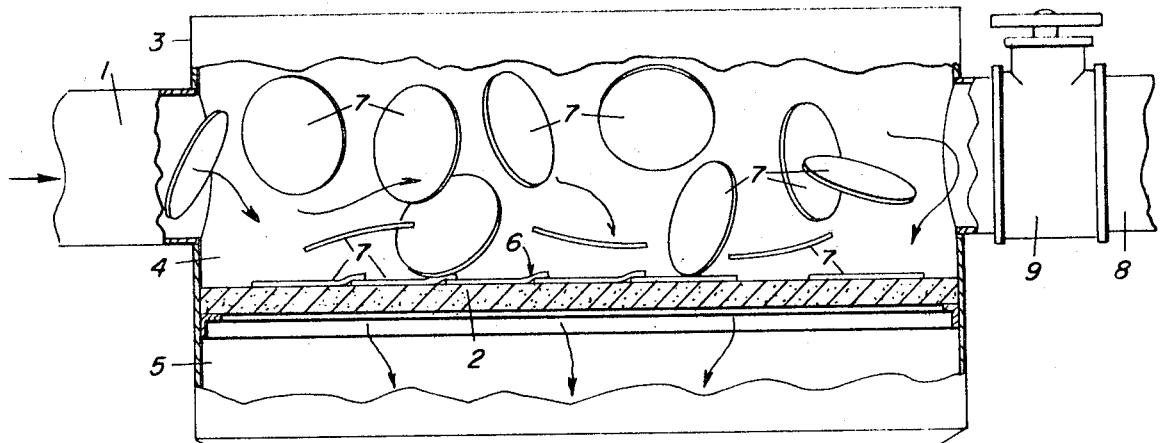

An important aspect of my invention is the discovery and development of a method for making ultrathin membrane discs. The essence of this process is the spraying of a solution of a membrane material onto a casting surface to form a number of small discs which after evaporation of the solvent are semipermeable membranes. In this way membranes can be produced which have a diameter of approximately 10 to 1,000 microns and are about 0.01 to 0.1 micron thick.

One of the advantages of this invention is that a wider choice of membrane-forming materials can be used than has previously been the case with continuous asymmetric membrane technology. For example, it is feasible to use polymers which posses good intrinsic osmotic characteristics, but which are either very expensive or not amenable to fabrication into pressure stable asymmetric membranes. Numerous materials may be used to form the membrane discs. In particular, the invention may be used to form ultrathin membrane discs from solutions or melts of neutral polymers such as cellulose acetate, cellulose nitrate, cellulose butyrate, polyamides, poly-vinyl carbonate and similar compounds.

A dilute solution of this membrane material is then sprayed on a casting surface. In this step there are a number of variables which determine whether discs will be formed and the quality of the discs formed. Among these variables are the relative speed of the spraying nozzle to the casting surface, the distance of the nozzle from the casting surface, and the nozzle pressure. It is difficult to specify conditions which will give the best results for membrane production; in any situation these operating conditions must be discovered through trial and error. From experience to date, however, the rough guidelines shown in Table I can be used.

TABLE I

| Condition | Broad Range | Preferred Range |
|---|---|---|
| Relative speed of nozzle to casting surface | 2 to 12 ft/sec | 8 ft/sec |
| Distance of nozzle from casting surface | 8 to 18 inches | 11 to 14 inches |
| Nozzle pressure | 60 to 150 psi | 60 to 100 psi |

When selecting the proper parameters the distance of the nozzle from the casting surface and the relative velocity of thse devices should be chosen so that regularly shaped individual droplets are formed. If these conditions are not properly controlled, the droplets may either coalesce or take on irregular shapes which would detract from their ability to form dynamic membranes. The nozzle pressure is adjusted to control the size distribution of the discs formed. Depending on the type of spray nozzle used, the pressure employed may make a considerable difference in both the average diameter and the size distribution of the discs formed.

In addition to these variables there are other conditions which may affect the membrane properties. Among these are the concentration of the casting solution and the spray casting conditions such as the rate of solvent removal and the humidity. These variables will also be important in determining the thickness and structure of the membrane discs and the osmotic properties they will have. The effects of variations in these parameters may be predicted from the knowledge of their effect on conventionally cast membranes. For example, it has been found that dilution of the casting solution produces discs which are thinner and more fragile than those produced from a more concentrated solution—a phenomenon also observed in casting continuous membranes.

The conditions which are most critical to the preparation of high quality membrane discs, however, are the solvent in the casting solution and the spraying surface. Experience to date with various solvents and casting surfaces indicate that production of suitable membrane discs depends heavily on what happens when the droplet strikes the casting surface and begins to form a membrane. The interaction of the casting surface and the solvent are important to this process.

Two specific problems in the formation process have been observed. First, it has been noted that in some cases the first droplet or droplets which are sprayed onto the casting surface spread out in a thin film over a large area. As subsequent drops strike the thin film, perfect membrane discs may be formed. Unfortunately, any attempt to remove the discs entangles them in the underlying polymer film and they become deformed and unusuable. This problem is particularly prevalent where the casting surface is a liquid or a liquid coated surface, but is has also been observed when using dry casting surfaces. The best way to combat this problem is to choose a solvent for the casting solution which is compatible with the particular casting surface. Alternatively, the casting surface may be wetted with a thin film of a liquid which will not react with the casting solution and on which the casting solution will not spread.

The second problem which has been encountered involves the removal of the membrane discs from the casting surface. It is important that the droplet be given sufficient time to form a disc which will not be distorted by the removal process. Conversely, particularly where dry surfaces are used, the membrane discs must not be allowed to remain so long that they stick to the surface. In short, this problem is a matter of finding the appropriate time for removal of the membranes from the casting surface easily and without harm to the discs.

The spraying can be conducted in a variety of ways and on a number of different casting surfaces. The simplest method is to spray the casting solution on a dry surface and after an appropriate time immerse the surface or wash it with a liquid which will remove the discs. Although a number of smooth materials, for example, chromium, Teflon, and glass may be suitable for this process, to date the most successful of these has been glass. When the appropriate casting solution has been used, ultrathin membrane discs sprayed on glass have been found to be perfectly formed and are easy to remove.

In addition to solid casting surfaces spraying may be performed on quiescent liquid surfaces. The problem of forming a base film upon which subsequent discs are formed, however, is a particular problem when a liquid casting surface is used. As mentioned previously, this problem may be avoided by selecting a casting liquid and casting solvent which do not react in this manner. Alternatively the liquid casting surface may be pretreated with the solvent in the casting solution so that spreading of the first drops of casting solution will not occur.

A third type of casting surface which may be used is a liquid coated solid surface. It is particularly advantageous in overcoming problems of disc removal and may be adapted to provide a continuous mechanized process for preparing large quantities of ultrathin membrane discs. For example, a wetted rotating drum or belt may be used. The casting solution is sprayed through a narrow slit to localize the spray and to prevent over-spraying. The system is designed so that the drum or belt rotates through a liquid bath or washing area to remove the discs at the appropriate time. A newly wetted surface leaves the bath or spray and rotates back to the spray casting area to provide a fresh surface for the casting of more discs.

After the membrane discs have been prepared by any of the basic casting techniques, it is possible to improve their osmotic properties by appropriate treatment, for example, immersion in cold water or annealing in hot water. It is also possible that the membranes can be dried, for example, by freeze drying process of Robert L. Riley et al., described in U.S. Pat. No. 3,428,584. Appropriately dried membranes can be stored in the absence of water without any harmful effects. Later they can be primed with water and are then ready for use.

To utilize the membrane discs to form a dynamic membrane the discs are slurried in water and are pumped into the feed portion of a reverse osmosis cell such as that shown schematically in FIG. 1. Although shown as a plate type reverse osmosis unit, any conventional design of reverse osmosis equipment can be used including the popular multiple tube type which has the advantage of providing a large amount of membrane surface area in a given volume of separation equipment.

Referring to FIG. 1, a slurry of small membrane discs 7 are pumped through line 1 into pressure vessel 3 which is separated into a feed chamber 4 and a product recovery chamber 5 by the porous support layer 2 which transverses the vessel. The porous support may be any of the materials conventionally used in the art such as cellulose acetate, polysulfone, sintered metal, porous glass, etc.

To form the dynamic membrane the reject valve 9 on line 8 leading from the feed side of the pressure vessel is closed so that the only avenue for water to escape is through the porous support 2, into the product recovery chamber 5 and out through valve 11 and line 10. By using this procedure it is unnecessary to gradually increase the pressure in order to deposit a layer of membrane discs on the support layer 2. A constant pressure of about 800 psi is used and the flow of water through the support causes a suction force which as depicted in FIG. 1 leaves a layer 6 of overlapping membrane discs on the support. The completion of the layer can be detected by monitoring the flow rate of water coming through line 10. When the rate becomes constant, the deposition of discs is no longer taking place to any great extent.

Figure 2:
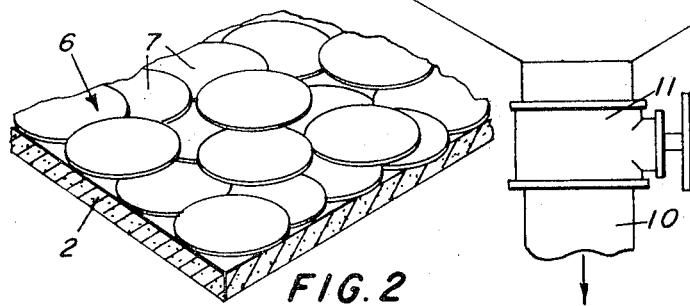

FIG. 2 is a perspective view of the dynamic membrane composed of porous support layer 2 and a layer of membrane discs 6. This layer 6 is composed of overlapping membrane discs 7 which effectively cover the surface area of the porous substrate 2 and provide the active layer which is responsible for the salt rejection of the membrane. When used in a reverse osmosis separation such as the desalination of water, the flow of the slurry of membrane discs is discontinued and saline water is pumped through line 1 into the feed chamber 4 at a pressure greater than osmotic. Pure water passes through the layer of membrane discs 6 and porous substrate 2 into the product recovery chamber 5. Valve 11 is open and pure water is recovered through line 10. Valve 9 is also open so that concentrated brine can be withdrawn from the feed chamber via line 8.

One advantage of this invention is that imperfections which develop in the active membrane layer 6 during the course of operation may be repaired in situ. This is accomplished simply by following the procedure outlined previously with regard to FIG. 1 using a dispersion of ultrathin membrane discs. Otherwise, desalination will continue uninterrupted until the active membrane layer becomes clogged by deposits or loses its salt rejecting capacity. At that time the existing layer of membrane discs can be removed and replaced with a new layer, the entire operation being performed in situ.

Figure 3:
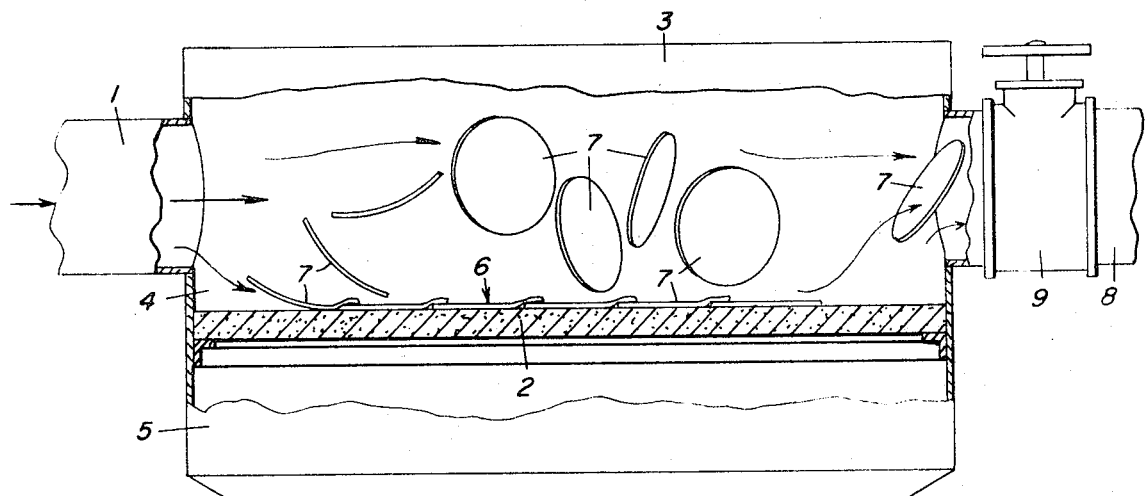

The process of removing the membrane discs is shown schematically in FIG. 3. Water, either fresh or saline, is pumped at a low pressure and high flow rate through line 1 into the desalination unit 3. Since valve 11 is closed, water does not flow through the membrane composed of porous substrate 2 and a layer 6 of membrane discs 7 and into the product recovery compartment 5. Instead, the water flows across the surface of the membrane in chamber 4, the turbulence disrupting the membrane disc layer 6 and sweeping these individual discs 7 through valve 9 and out line 8. If the turbulence of the sweeping stream is insufficient to disrupt the layer of membrane discs, a solvent can be used which dissolves the membrane discs but does not affect the porous support layer. Where cellulose acetate membrane discs are used, removal can be accomplished by hydrolysis with dilute aqueous ammonia.

Finally, although the description of my invention has been particularly directed toward the reverse osmosis desalination of sea water, the ultrathin membrane discs made by my invention may also be useful in preparing dynamic membranes for use in the separation of water from electrolyte solutions including sea water, brackish water, acid mine water, and industrial brines and bitterns. The membranes may also be used in the separation of organic liquids; the purification and concentration of liquid foods such as citrus juices, beer, and syrups; and the purification of liquid wastes such as urine.

Example 1

Ultrathin membrane discs were prepared from 1 percent solutions of cellulose acetate by spraying the solution onto a glass side. Spraying was accomplished using a nozzle with a conical spray pattern (nozzle No. 60, Spraying Systems, Company, Wheaton, Illinois) at a nozzle pressure of 100 psi. The height of the nozzle above the casting surface casting distance was varied and the translational speed of the nozzle relative to the surface was chosen from among the alternatives of 2, 4 or 8 ft/sec. The degree and quality of disc formation was then determined by microscopic inspection. Some of the conditions at which discs were successfully formed are shown in Table II. Several other examples are shown in which slight variations in these conditions failed to produce ultrathin membrane discs.

Example 2

In Example 1 membrane discs were prepared using glass as the spraying surface. Another suitable surface is wetted chromed plate which has been prepared by flaming the chromed surface and subsequently immersing it in water. Ultrathin membrane discs were prepared by spraying 1 percent solutions of cellulose acetate onto this wetted chromed surface and subsequently removing the discs with warm (50°C) deionized water. A nozzle with a flat spray (nozzle No. 650017, Spraying Systems Company, Wheaton, Illinois) was used at a pressure of 100 psi, a height of 12.5 inches above the surface and a translational speed of about 4 ft/sec. Solutions and conditions yielding well shaped discs are indicated in Table III. The quality of the discs formed was determined by microscopic examination, and the percentage by weight of the ultrathin membrane discs which could be removed from the surface by washing was calculated.

lutions from which ultrathin reverse osmosis membrane discs were successfully prepared.

Example 4

Figure 4:
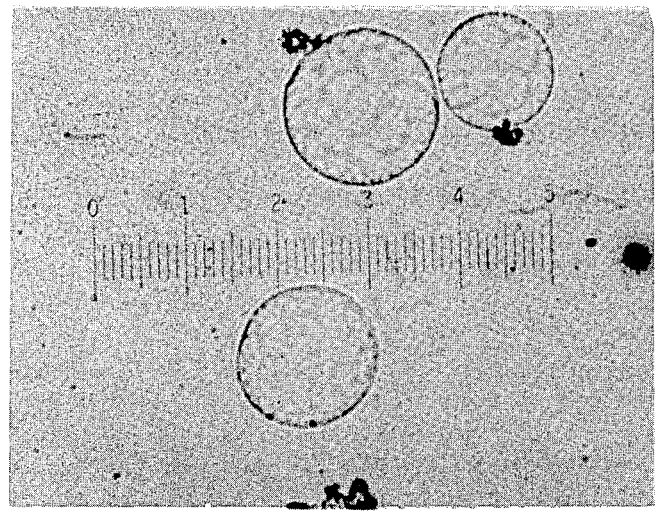
Figure 5:
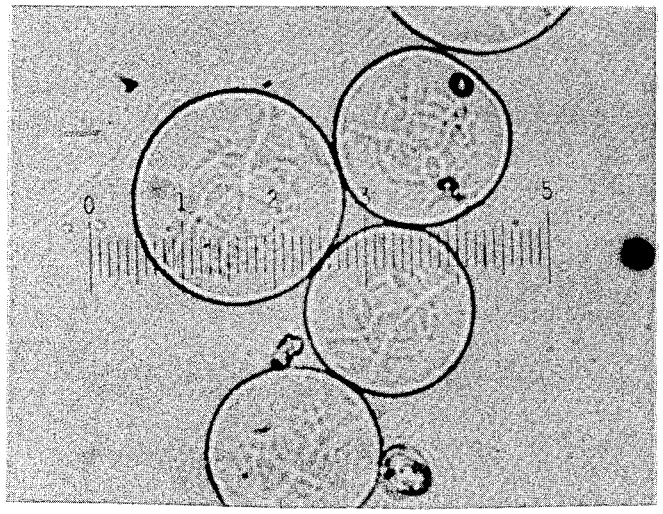

Ultrathin membrane discs were prepared from solutions of 1 percent cellulose acetate in 4:1 dioxane: methylethyl ketone or 1:1 dioxane:tetrahydrofuran. The solutions were sprayed through the same nozzle as that used in Example 2, at a pressure of 100 psi, a distance of 11 inches from the dry glass casting surface and a translational speed of 4 ft/sec. Excellent discs were prepared from either solution and could be readily removed by immersing the glass in water. Photomicrographs of these membrane discs were prepared. FIG. 4 is a photomicrograph of ultrathin discs prepared from the solution of 4:1 dioxane:methylethyl ketone. FIG. 5 shows discs prepared from the 1 percent solution of cellulose acetate in 1:1 dioxane:tetrahydrofuran. In each drawing the smallest division represents 10 millimicrons.

Example 5

Ultrathin membrane discs were prepared from a 1 percent solution of cellulose acetate in 1:1 dioxane:tetrahydrofuran as in the previous example. The glass casting surface was immersed in water 30 seconds after spraying to remove the discs, cleaned, and resprayed

TABLE II

| Test | Solvent system | Casting speed (ft/sec) | Casting distance (inches) | Description of the spray-cast particles |
|---|---|---|---|---|
| A | Dioxane | 8 | 18 | Discs, structured center. |
| B | Do. | 11 | 24 | Some discs, plus flat irregular shapes. |
| C | 1:1 Dioxane: 1,1,2 Trichloroethane | 8 | 18 | Disc, structured center. |
| D | Do. | 2 | 18 | Polymer coalesced. |
| E | 4:1 Dioxane: Methylethyl ketone | 8 | 18 | Fair discs, structured centers. |
| F | Do. | 8 | 11, 8 | Tendency to coalesce. |
| G | Do. | 2 | 14 | Polymer coalesced. |
| H | Do. | 4 | 14 | Some discs, also some irregular shapes. |
| I | Do. | 8 | 14 | Discs, structured centers. |

TABLE III

| Test | Solvent system | Results | Percentage removal by washing |
|---|---|---|---|
| A | 4:1 Dioxane:methylethyl ketone | Good discs easily removed from plate. | |
| B | Cyclohexanone | Flat, slightly irregular shape | 90 |
| C | 3:1 Ethyl acetate:acetic anhydride | Flat, slightly off-round shape | 80 |
| D | 2:1 Ethyl acetate:acetic anhydride | Do. | 80 |
| E | 1:1 Ethyl acetate:acetic anhydride | Do. | 80 |
| F | 1:2 Ethyl acetate:acetic anhydride | Do. | 80 |
| G | 1:3 Ethyl acetate:acetic anhydride | Do. | 80 |

Example 3

To further compare the effects of the casting surface on the formation of ultrathin membrane discs, 1 percent cellulose acetate solutions of various solvents were sprayed onto both a dry and a wetted glass surface. The nozzle used in the previous example was used at a pressure of 100 psi, a distance of 11 inches from the casting surface and a translational speed of 4 ft/sec. Again the quality of the membrane discs formed was determined by observation with a microscope. Table IV lists the sowith the solution to form new discs. When a large quantity of the discs had been prepared, experiments were performed to determine their suitability for reverse osmosis.

Tests were carried out using a 3 in. diameter flat reverse osmosis cell. The substratum used was Millipore VSWP. The periphery of the substratum was masked with pressure sensitive tape to minimize the boundary effects in determining the ability to form dynamic membranes. After taping, an area of 14 cm$^2$

TABLE IV

| Test | Solvent system | Dry glass microscope slide description of the spray-cast particle | Appearance of particles obtained by spraying onto a wetted glass microscope slide |
|---|---|---|---|
| A | 4:1 Nitroethane:methanol | Fair quality discs, wrinkled appearance; 150-250 millimicron dia. | Good quality discs, slightly-grainy appearance; 140 millimicron dia. |
| B | 1:1 Nitroethane:methanol | Fair quality discs, structured appearance; 100-150 millimicron dia. | Good quality discs, slightly-grainy appearance; 70-150 millimicron dia. |
| C | Nitroethane | Fair discs, "speckled" in appearance; about 50-250 millimicron dia. | Good quality discs; about 70 millimicron dia. |
| D | 4:1 Nitroethane:n-butanol | Good quality discs, essentially featureless interior; 50-180 millimicron dia. | Excellent discs; essentially featureless; 40-200 millimicron dia. |
| E | 4:1 Nitroethane:ethyl acetate | Poor quality, highly structured discs; 100-200 millimicron dia. | Good quality discs, textured appearance; 120-250 millimicron dia. |
| F | Triacetin | Discs plus flat irregular shapes, unstructured; 50-300 millicron dia. | Flat, near-round particles, straited, 100-250 millimicron dia. | remained exposed for the in situ deposition of the ultrathin membrane discs. The channel above the substratum was 10 mil high.

Deposition of the membrane discs was accomplished by pumping a slurry of discs into the test cell. Best results were achieved by closing the exit valve from the feed side of the membrane cell as depicted in FIG. 1. No advantage was obtained by incrementally raising the pressure rather than using a constant pressure. Disc deposition was routinely carried out at a pressure of 800 psi. Deposition was permitted to occur until a reasonably constant flux through the membrane was achieved indicating that the formation of a thin layer of discs on the substratum had been completed. A typical membrane tested at 800 psi using a 100 ppm aqueous solution of Trypan Blue dye was found not to pass dye indicating that the discs had deposited to form a reasonably tight membrane.

Membranes were then testsd at 205°C on 3,000 ppm solutions of sodium sulfate and sodium chloride at a pressure of 800 psi and a feed flow rate of 300 ml/min. Results are given in Table V.

TABLE V

| Run | Deposition Time | Flux (gfd) | Sodium Sulfate Rejection (%) | Sodium Chloride Rejection (%) |
|---|---|---|---|---|
| A | 1.0 | 96.0 | — | — |
|   | 18.8 | 19.0 | — | — |
|   | 22.0 | 16.7 | 81.7 | 34.2 |
| B | 2.0 | 48 | — | — |
|   | 23.5 | 14.5 | 74.0 | 24.4 |
| C | 23.0 | 18.7 | — | — |
|   | 45.5 | 10.4 | 72.6 | 26.0 |

Example 6

Tests were also performed to evaluate the formation of dyanamic membranes in tubular reverse osmosis devices. The equipment used consisted of a one-half inch diameter outer tube supporting a concentric substratum. Outer tubes of both braided glass fiber and of stainless steel were utilized. The stainless steel tubes had 13 mil holes drilled in the test area for removal of permeate. The substratum consisted of a liner of Dacron-polysulfone. The objective was to form a dynamic membrane on the inside surface of this liner. When saline water is passed under pressure through the inside of the tube the active layer separates out pure water which leaves through the porous substratum and the outer tube.

To minimize the entrance effects during the deposition of the membrane, the first 9 inches of the 13.5 inch long liner were dipped in a 7.5 percent solution of ethyl cellulose in methanol. This provided an effective sealent and isolated a small area in which membrane deposition could be evaluated.

Ultrathin membrane discs were prepared by spraying a 1 percent solution of cellulose acetate in 1:4 dioxane:methylethyl ketone onto glass plates, followed by immersion in deionized water within 30 seconds to remove the discs. Deposition of the membrane on the liner was achieved by passing a dispersion of the membrane discs into the membrane tube at a pressure of 800 psi. The reject valve was opened briefly to remove entrapped air and was then closed during membrane deposition. Membraning was considered complete when the flux approached a constant valve. Reverse osmosis properties were then evaluated at 25°C on a 3,000 ppm solution of either sodium sulfate or sodium chloride. The feed solution pressurized at 800 psi was fed at the rate of either 1 or 2 gallons per minute. The results are given in Table VI.

In a second run the membrane discs were annealed at 85°C prior to deposition. The slight increase in the salt retention with respect to either solution indicates that reverse osmosis performance of the dynamic membrane is related to the intrinsic properties of the discs.

TABLE VI

| Discs | Deposition time (hrs) | Tube type | Feed flow rate (gal/min) | Flux (gfd) | Sodium sulfate rejection (%) | Sodium chloride rejection (%) |
|---|---|---|---|---|---|---|
| Standard | 89 | ½-inch diameter braided glass-fiber tube | 1 | 10.3 | 93.7 | 31.5 |
| Annealed | 47.5 | ½-inch diameter stainless steel tube | 2 | 13.5 | 96 | 33.5 |

I claim:

1. A membrane suitable for use in a reverse osmosis separation consisting of:
   an active layer comprising numerous overlapping ultrathin membrane discs and
   a porous support layer offering structural support for said active layer and allowing the free passage of permeate away from said active layer.

2. The membrane of claim 1 in which said reverse osmosis separation is the desalination of water.

3. The membrane of claim 1 in which said ultrathin membrane discs consist of a neutral polymer.

4. The membrane of claim 3 in which said neutra' polymer is cellulose acetate.

5. A process for the separation of pure solvent from a solution by reverse osmosis comprising the steps of:
   forming a dispersion of ultrathin membrane discs,
   passing said dispersion over the feed side of a porous support material in the separation apparatus to deposit a layer of ultrathin discs on said support material,
   using said layer of ultrathin membrane discs as the active reverse osmosis membrane to effect said separation, and
   repairing at least a portion of said layer of ultrathin membrane discs when necessary by passing said dispersion of ultrathin membrane discs over the feed side of said porous support material to remake said layer.

6. The process of claim 5 wherein said separation is the desalination of water.

7. The process of claim 5 wherein said ultrathin membrane discs are composed of a neutral polymer.

8. The process of claim 7 wherein said neutral polymer is cellulose acetate.

9. The process of claim 5 including the step of removing said active layer of ultrathin membrane discs when replacement is required, prior to said repairing of at least a portion of said layer.

* * * * *